(12) United States Patent
Walker et al.

(10) Patent No.: US 11,511,847 B2
(45) Date of Patent: Nov. 29, 2022

(54) SKIN PANEL OF COMPOSITE MATERIAL HAVING AN INTERNAL GRID

(71) Applicant: The Boeing Company, Chicago, IL (US)

(72) Inventors: Steven P. Walker, Arlington, WA (US); Gregory M. Santini, Bothell, WA (US); Gary D. Oakes, Renton, WA (US); Patrick B. Stickler, Everett, WA (US)

(73) Assignee: The Boeing Company, Chicago, IL (US)

( * ) Notice: Subject to any disclaimer, the term of this patent is extended or adjusted under 35 U.S.C. 154(b) by 1203 days.

(21) Appl. No.: 15/471,422

(22) Filed: Mar. 28, 2017

(65) Prior Publication Data

US 2018/0281923 A1 Oct. 4, 2018

(51) Int. Cl.
| | | |
|---|---|---|
| *B32B 1/02* | (2006.01) | |
| *B64C 3/26* | (2006.01) | |
| *B64C 1/12* | (2006.01) | |
| *B64C 3/20* | (2006.01) | |
| *B32B 1/08* | (2006.01) | |
| *B64C 1/00* | (2006.01) | |

(52) U.S. Cl.
CPC ............... *B64C 3/26* (2013.01); *B64C 1/12* (2013.01); *B64C 3/20* (2013.01); *B64C 2001/0072* (2013.01)

(58) Field of Classification Search
CPC .. B32B 1/02; B32B 3/26; B32B 27/00; B32B 27/20; Y10T 428/1352

USPC .............................................. 428/35.7, 304.4
See application file for complete search history.

(56) References Cited

U.S. PATENT DOCUMENTS

| | | | |
|---|---|---|---|
| 6,007,894 A | 12/1999 | Barnes et al. | |
| 6,513,757 B1 | 2/2003 | Amaoka et al. | |
| 7,097,731 B2 * | 8/2006 | Puriefoy | B29C 37/0075 |
| | | | 156/212 |
| 7,197,852 B2 | 4/2007 | Grillos | |
| 8,642,151 B2 | 2/2014 | Goering et al. | |
| 8,851,422 B2 | 10/2014 | Dan-Jumbo | |
| 8,973,871 B2 * | 3/2015 | Marcoe | B64C 3/185 |
| | | | 244/123.7 |
| 9,302,446 B2 | 4/2016 | Fink | |
| 2009/0038744 A1 * | 2/2009 | Lee | B29C 70/342 |
| | | | 156/183 |
| 2009/0148647 A1 * | 6/2009 | Jones | B29C 70/30 |
| | | | 428/58 |
| 2009/0283635 A1 * | 11/2009 | Gerken | B29D 24/005 |
| | | | 244/117 R |

* cited by examiner

*Primary Examiner* — Marc A Patterson
(74) *Attorney, Agent, or Firm* — Quinn IP Law

(57) ABSTRACT

A skin panel configured for attachment to an aircraft structure is constructed of a composite material and has a continuous, smooth outer surface; a continuous, smooth inner surface that is configured for attachment to an aircraft structure; a peripheral edge that extends entirely around the skin panel and has a continuous, smooth surface and a plurality of cavities inside the material of the skin panel. The cavities reduce the weight of the skin panel without significantly detracting from the compression strength and tensile strength of the skin panel.

18 Claims, 10 Drawing Sheets

SKIN PANEL OF COMPOSITE MATERIAL HAVING AN INTERNAL GRID

FIELD

This disclosure pertains to a skin panel configured for attachment to an aircraft structure. The skin panel is constructed of a composite material and has a continuous, smooth outer surface; a continuous, smooth inner surface that is configured for attachment to an aircraft structure; a peripheral edge that extends entirely around the skin panel and has a continuous, smooth surface and a plurality of cavities inside the material of the skin panel. The cavities reduce the weight of the skin panel without significantly detracting from the compression strength and tensile strength of the skin panel.

BACKGROUND

Aircraft structures, for example an aircraft wing are typically constructed with ribs in the interior of the wing. The ribs are oriented laterally, extending between a leading edge and a trailing edge of the wing. The ribs are spatially arranged along the longitudinal length of the wing interior. Stringers are typically connected to the ribs in the wing interior to add strength and rigidity to the wing. The stringers extend along the longitudinal length of the wing interior.

Aircraft wings constructed with reinforcing stringers are costly on a component level. The wings constructed with stringers can also lead to panel warpage. Use of stringers in reinforcing an aircraft wing also increases the assembly cost of the wing overall. Additionally, the use of stringers to reinforce the wing adds to the weight of the aircraft wing.

SUMMARY

The skin panel of this disclosure is configured for attachment to an aircraft structure, for example an aircraft wing. The skin panel is constructed of a composite material, for example carbon fiber reinforced plastic.

The skin panel is formed from at least an outer sheet and an inner sheet of composite material. A peripheral edge surface extends entirely around the outer sheet and inner sheet of the skin panel. The peripheral edge surface is a continuous, smooth surface entirely around the skin panel. A continuous, smooth surface as used herein is defined as a surface that is without holes, openings, indentations, projections and other such disruptions on the surface.

The skin panel is formed with an outer surface on the outer sheet that is entirely surrounded by the peripheral edge surface. The outer surface is a continuous, smooth surface within the peripheral edge surface.

The skin panel is also formed with an inner surface on the inner sheet that is entirely surrounded by the peripheral edge surface. The inner surface is a continuous, smooth surface within the peripheral edge surface. The inner surface is opposite the outer surface on the skin panel and is configured for attachment to an aircraft structure.

The thickness of the skin panel between the outer surface and the inner surface could be constant within the peripheral edge surface. Alternatively, the thickness of the outer sheet and the inner sheet could be non-constant and could taper as the sheets extend from one edge of the sheet to the opposite edge of the sheet.

In the interior of the skin panel, the thickness of the outer sheet forms an outer interior region of the composite material. The outer interior region of the composite material terminates at the outer surface.

The thickness of the inner sheet of the skin panel forms an inner interior region of the composite material. The inner interior region of the composite material terminates at the inner surface.

The outer interior region of the material of the skin panel is secured to the inner interior region of the material of the skin panel with a plurality of cavities inside the material of the skin panel. The plurality of cavities are positioned in a plane between the outer surface and the inner surface. The plurality of cavities form an grid inside the skin panel. The plurality of cavities also reduce the weight of the skin panel.

In one embodiment of the skin panel, an intermediate spacer sheet of composite material is secured between the outer sheet and inner sheet. The thickness of the intermediate spacer sheet forms an intermediate region of the composite material positioned between the outer interior region of the composite material and the inner interior region of the composite material. A plurality of cavities forming the grid are positioned in the intermediate interior region. The plurality of cavities are formed in the intermediate spacer sheet sandwiched between an outer sheet of the composite material and an inner sheet of the composite material. The inner sheet of composite material, the outer sheet of composite material and the intermediate sheet of the composite material are co-cured in forming the skin panel.

In a further embodiment of the skin panel, the intermediate spacer sheet of composite material having the plurality of cavities forming the grid is cured prior to being sandwiched between the outer sheet of composite material and the inner sheet of composite material. With the previously cured intermediate spacer sheet positioned between the outer sheet of composite material and the inner sheet of composite material, the three sheets are cured, bonding the outer sheet of composite material to one side of the previously cured intermediate spacer sheet of composite material and bonding the inner sheet of composite material to the opposite side of the previous cured intermediate spacer sheet of composite material.

In a still further embodiment of the skin panel, the skin panel is comprised of an outer sheet of composite material and an inner sheet of composite material that have been cured. The plurality of cavities are machined into opposing surfaces of the outer sheet of composite material and the inner sheet of composite material. The outer sheet of composite material and the inner sheet of composite material are then secured together by adhesives, by mechanical fasteners or by other equivalent means, forming the skin panel with an internal grid.

The skin panel constructed with the internal grid achieves a lightweight, skin panel which does not require additional stiffening elements, such as stringers, is of reduced weight, and can be affordably manufactured using current manufacturing technology.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

Further features of the skin panel constructed of composite material with an internal grid are set forth in the following detailed description of the skin panel and in the drawing figures.

DETAILED DESCRIPTION

The skin panel 10 of this disclosure is configured for attachment to an aircraft structure, for example the fuselage of an aircraft, the tail rudder of an aircraft or an aircraft wing. The skin panel then forms the exterior surface of the aircraft that is exposed to the exterior environment of the aircraft. The skin panel is constructed of a composite material, for example carbon fiber reinforced plastic. Other equivalent materials could be used in the construction of the skin panel. In use of the skin panel in the construction of an aircraft wing, the skin panel would be secured directly to the ribs in the interior of the aircraft wing. The strength of the skin panel constructed in the manner to be described eliminates the need for stringers in the interior of the aircraft wing and thereby reduces the weight of the aircraft wing, simplifies the construction of the aircraft wing, and reduces the construction cost of the aircraft wing. The skin panel is constructed in such a way that it has the compression resistant strength required of a skin panel as well as the tensile strength required of a skin panel, while reducing the weight of the skin panel.

Figure 1:
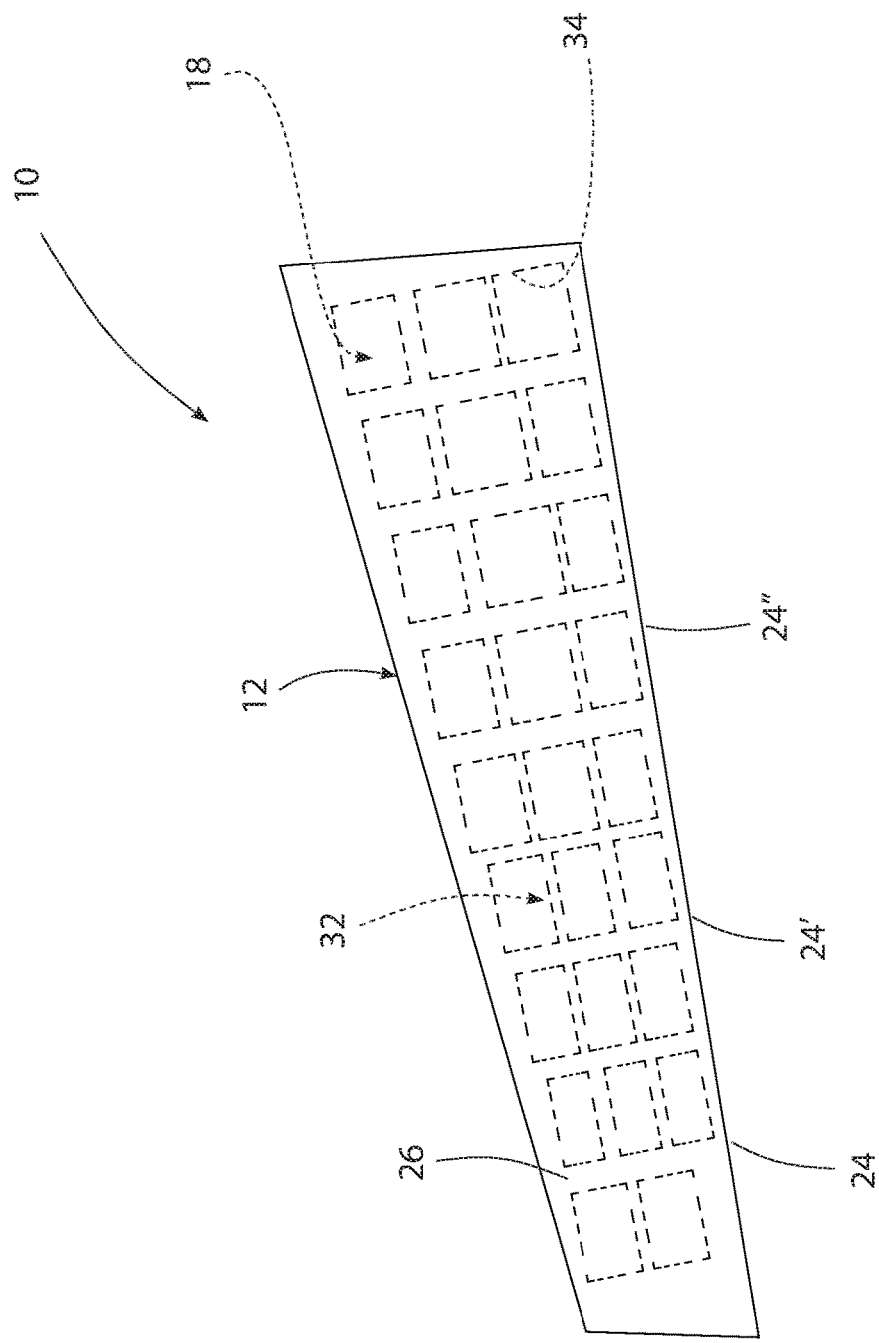
FIG. 1 is a schematic representation of an embodiment of the skin panel of this disclosure.

FIG. 1 is a schematic representation of a top surface of the skin panel 10 of this disclosure, the opposite bottom surface being a mirror image thereof.

Figure 2:
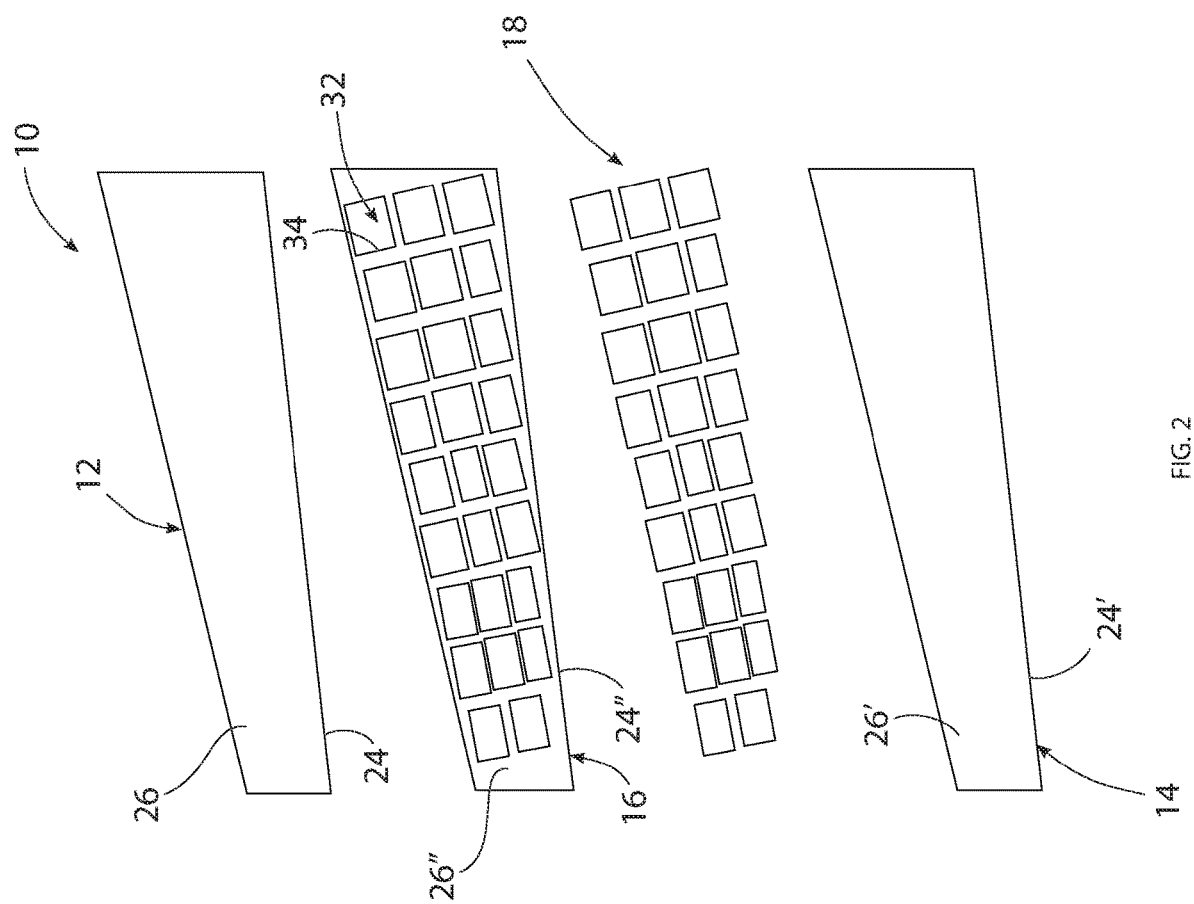
FIG. 2 is a schematic representation of an exploded view of the component parts of the embodiment of the skin panel represented in FIG. 1.

FIG. 2 is a schematic representation of a method of constructing the embodiment of the skin panel 10 represented in FIG. 1. The skin panel 10 of FIG. 2 is basically comprised of an outer sheet 12, an inner sheet 14, an intermediate spacer sheet 16 and fly away tooling components 18. The outer sheet 12, the inner sheet 14 and the intermediate spacer sheet 16 are each constructed of a composite material, for example carbon fiber reinforced plastic. In the construction of the skin panel 10 represented in FIG. 2, the carbon fiber reinforced plastic is a pre-preg.

Figure 3:
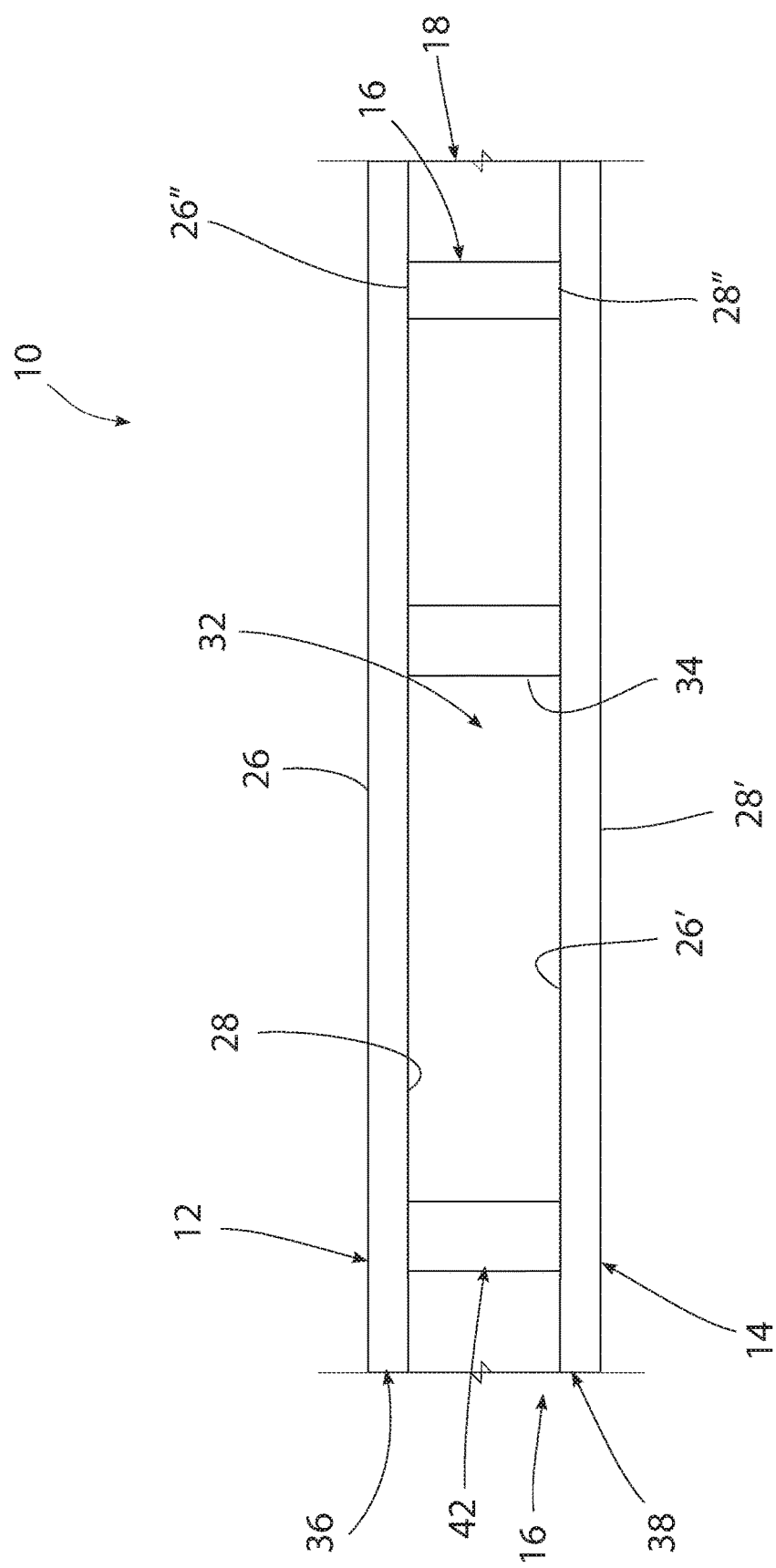
FIG. 3 is a schematic representation of a partial cross-section view of the assembled component parts of the skin panel represented in FIG. 2.

The outer sheet 12 will make up a portion of the outer, exterior surface of the aircraft when the skin panel 10 is attached to a structure of the aircraft. The outer sheet 12 is represented in FIG. 2 as having a peripheral edge 24 that extends entirely around the outer sheet 12. The peripheral edge 24 represented in FIG. 2 has four straight sections that define a polygonal configuration of the outer sheet 12. However, it should be understood that the peripheral edge 24 of the outer sheet 12 could have a variety of different configurations that best suit the outer sheet 12 for its intended use in the construction of an aircraft. The peripheral edge 24 is a continuous, smooth surface that extends entirely around the outer sheet 12. A continuous, smooth surface as used herein is defined as a surface that is without holes, openings, indentations, projections and other such disruptions on the surface. The peripheral edge 24 entirely surrounds a first surface 26 of the outer sheet 12 that will be directed to the exterior environment of the aircraft in use of the skin panel. The first surface 26 is a continuous, smooth surface within the peripheral edge 24 of the outer sheet 12. The outer sheet 12 also has a second surface 28 on an opposite side of the outer sheet 12 from the first surface 26. The second surface is not visible in FIG. 2, but is represented in FIG. 3. The second surface 28 is also a continuous, smooth surface within the peripheral edge 24 and has the same configuration as the first surface 26. The outer sheet 12 could have a constant thickness between the first surface 26 and the opposite second surface 28. Alternatively, the thickness of the outer sheet 12 could be non-constant and could taper as the outer sheet 12 extends from one edge of the outer sheet 12 to an opposite edge of the outer sheet 12.

The inner sheet 14 has substantially the same construction as the outer sheet 12. It is referred to as the inner sheet because it will be directed toward the interior of an aircraft structure when the skin panel 10 is attached to an aircraft structure in use. The inner sheet 14 has a peripheral edge 24' that has substantially the same configuration as the peripheral edge 24 of the outer sheet 12. The peripheral edge 24' of the inner sheet 14 is a continuous, smooth surface that extends entirely around the inner sheet 14. The inner sheet 14 also has a first surface 26' that has substantially the same configuration as the first surface 26 of the outer sheet 12. The first surface 26' of the inner sheet 14 is a continuous, smooth surface within the peripheral edge surface 24' of the inner sheet 14. The inner sheet 14 also has a second surface 28' on an opposite side of the inner sheet from the first surface 26'. The second surface 28' has substantially the same configuration as the first surface 26'. The second surface 28' is a continuous, smooth surface within the peripheral edge 24' of the inner sheet 14. The inner sheet 14 could have a constant thickness between the first surface 26' and the second surface 28' within the peripheral edge 24' of the inner sheet. Alternatively, the thickness of the inner sheet 14 could be non-constant and could taper as the inner sheet 14 extends from one edge of the inner sheet 14 to an opposite edge of the inner sheet.

The intermediate spacer sheet 16 has substantially the same configuration as the outer sheet 12 and the inner sheet 14. The intermediate spacer sheet 16 has a peripheral edge 24" that extends entirely around the intermediate spacer sheet. The peripheral edge 24" has substantially the same configuration as the peripheral edge 24 of the outer sheet 12 and the peripheral edge 24' of the inner sheet 14. The peripheral edge 24" of the intermediate spacer sheet 16 is a continuous, smooth surface entirely around the intermediate spacer sheet. A thickness of the intermediate spacer sheet 16 between a first surface 26" and an opposite second surface 28" could be constant within the peripheral edge 24" of the intermediate spacer sheet. Alternatively, the thickness of the intermediate spacer sheet 16 could be non-constant and could taper as the intermediate spacer sheet 16 extends from one edge to an opposite edge of the intermediate spacer sheet 16.

A plurality of holes extend completely through the intermediate spacer sheet 16 and form a plurality of cavities 32 in the intermediate spacer sheet. Together the plurality of cavities 32 form an grid in the intermediate spacer sheet 16. Each cavity of the plurality of cavities 32 has a peripheral cavity surface 34 that extends entirely around the cavity. The peripheral cavity surface 34 has a length dimension around the cavity 32 and a thickness dimension across the cavity. The thickness dimension of each cavity of the plurality of cavities 32 has the same thickness dimension as the intermediate spacer sheet 16.

Figure 7:
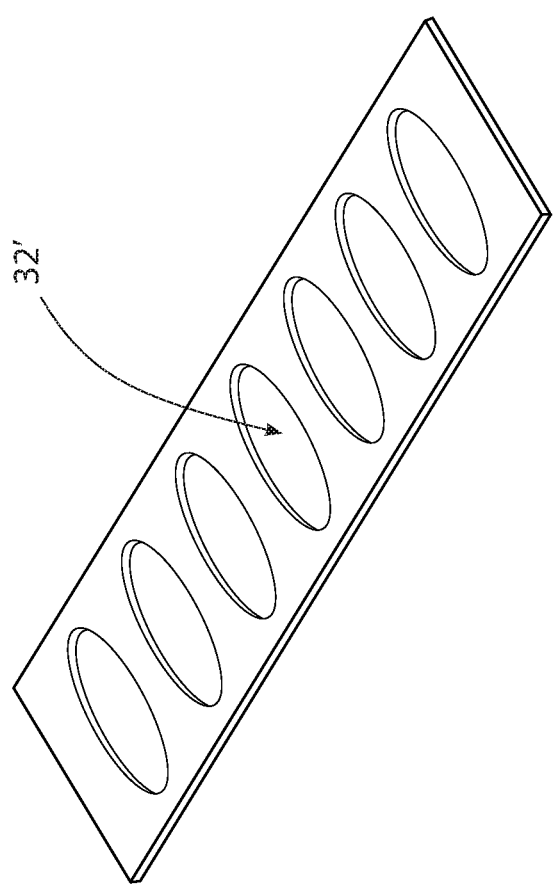
FIG. 7 is a schematic representation of an alternative cavity configuration that could be employed in the construction of the skin panel.
Figure 8:
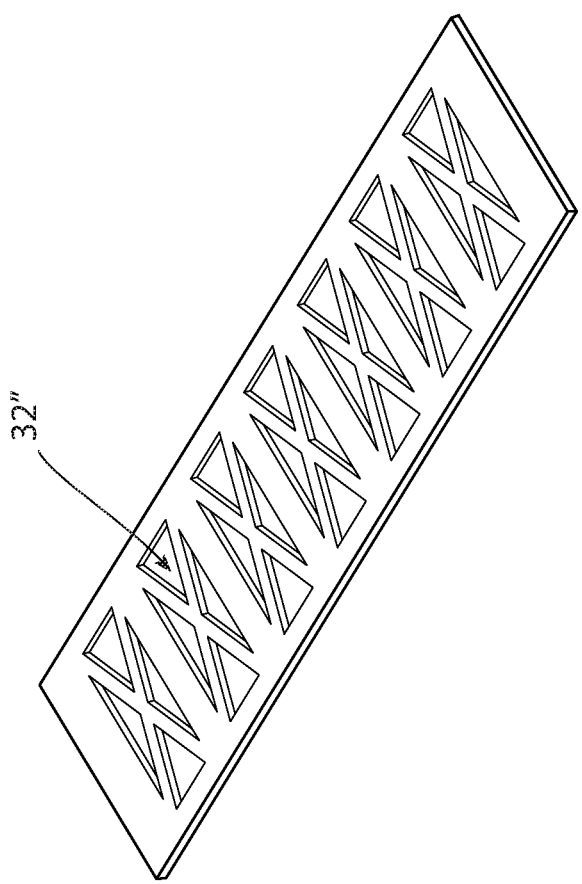
FIG. 8 is a schematic representation of an alternative cavity configuration that could be employed in the construction of the skin panel.
Figure 9:
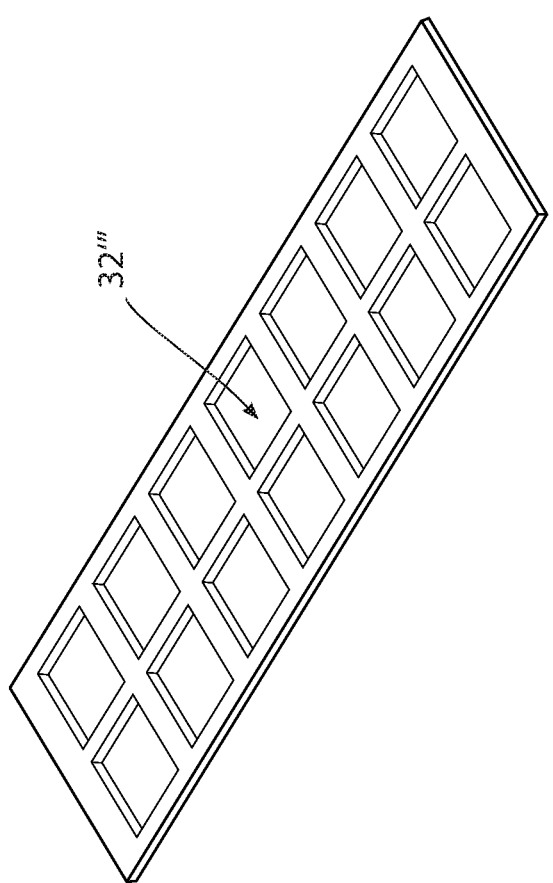
FIG. 9 is a schematic representation of an alternative cavity configuration that could be employed in the construction of the skin panel.

As represented in FIGS. 1 and 2, each cavity 32 of the plurality of cavities has a general rectangular configuration defined by the peripheral cavity surface 34. However, each cavity 32 could have a different configuration defined by its peripheral cavity surface 34. For example, the cavities 32' could have elliptical configurations as represented in FIG. 7. The cavities 32" could also have triangular configurations as represented in FIG. 8. Still further, the cavities 32''' could have square configurations as represented in FIG. 9.

The fly away tooling components 18 are a plurality of filler material parts that are the same in number as the plurality of cavities 32 and have substantially the same configurations as the cavities. Each of the fly away tooling components 18 is constructed of a lightweight, filler material such as a foam, a honeycomb core, or other equivalent material.

In constructing the skin panel 10 represented in FIGS. 1 and 2, the intermediate spacer sheet 16 with the plurality of fly away tooling components 18 positioned in the plurality of cavities 32 is positioned between the outer sheet 12 and the inner sheet 14. As represented in FIG. 3, the second surface 28 of the outer sheet 12 is positioned against the first surface 26" of the intermediate spacer sheet 16 and the first surface 26' of the inner sheet 14 is positioned against the second surface 28" of the intermediate spacer sheet 16. The peripheral edge 24 of the outer sheet 12, the peripheral edge 24' of the inner sheet 14 and the peripheral edge 24" of the intermediate spacer sheet 16 are all co-extensive and form a continuous, smooth peripheral edge surface around the skin panel 10. The outer sheet 12, the inner sheet 14 and the intermediate spacer sheet 16 are then co-cured by the application of heat and pressure to the skin panel 10. This bonds the carbon fiber reinforced plastic material of the outer sheet 12, the inner sheet 14 and the intermediate spacer sheet 16 together forming the skin panel 10 as a single, integral unit. The thickness of the skin panel 10 between an outer surface of the skin panel defined by the first surface 26 of the outer sheet 12 and an inner surface of the skin panel defined by the second surface 28' of the inner sheet 14 is constant within the peripheral edge of the skin panel defined by the peripheral edge 24 of the outer sheet 12, the peripheral edge 24' of the inner sheet 14 and the peripheral edge 24" of the intermediate spacer sheet 16.

Referring to FIG. 3, the plurality of cavities 32 that form the grid inside the composite material of the skin panel 10 are sandwiched between an outer interior region 36 of the composite material of the skin panel 10 that is created by the thickness of the outer sheet 12 and terminates at the first surface 26 of the outer sheet 12, and an inner interior region 38 of the composite material of the skin panel 10 that is created by the thickness of the inner sheet 14 and terminates at the second surface 28' of the inner sheet 14. The plurality of cavities 32 that form the grid inside the composite material of the skin panel 10 are surrounded by the composite material and are positioned in a single plane that extends through an intermediate interior region 42 of the composite material of the skin panel that is created by the thickness of the intermediate spacer sheet 16.

Figure 4:
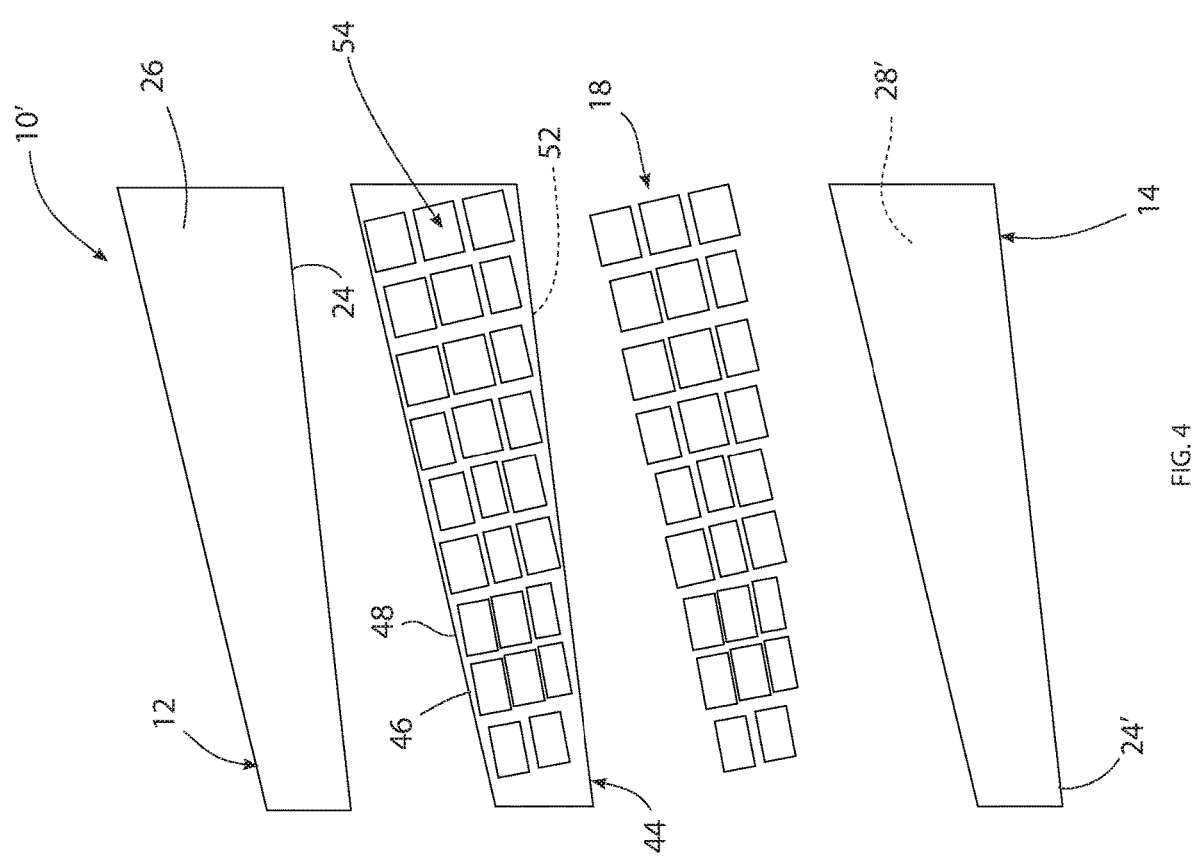
FIG. 4 is a schematic representation of an exploded view of the component parts of a further embodiment of the skin panel.

FIG. 4 is a schematic representation of a method of constructing a further embodiment of the skin panel 10'. The construction of the skin panel 10' of FIG. 4 is very similar to the construction of the skin panel 10 of FIGS. 1 and 2. The skin panel 10' of FIG. 4 also includes the outer sheet 12, inner sheet 14 and the fly away tooling components 18 of the skin panel of FIG. 2. The skin panel 10' of FIG. 4 also has an intermediate spacer sheet 44 that is substantially the same as the intermediate spacer sheet 16 of FIG. 2. However, in the skin panel 10' of FIG. 3, the intermediate spacer sheet 44 has been pre-cured. The intermediate spacer sheet 44 being pre-cured is the only difference between the construction of the skin panel 10' of FIG. 4 and the skin panel 10 of FIG. 2. The intermediate spacer sheet 44 also has a peripheral edge 46 that extends entirely around the intermediate spacer sheet. The peripheral edge 46 has substantially the same configuration as the peripheral edge 24 of the outer sheet 12 and the peripheral edge 24' of the inner sheet 14. The peripheral edge 46 of the intermediate spacer sheet 44 is a continuous, smooth surface entirely around the intermediate spacer sheet. The thickness of the intermediate spacer sheet 44 between a first surface 48 and a second surface 52 of the intermediate spacer sheet is constant within the peripheral edge 46 of the intermediate spacer sheet.

A plurality of holes 54 also extend completely through the intermediate spacer sheet 44 and form a plurality of cavities 54 in the intermediate spacer sheet. Together the plurality of cavities 54 form an grid in the intermediate spacer sheet 44. The plurality of cavities 54 in the intermediate spacer sheet 44 of FIG. 4 are substantially the same as those in the intermediate spacer sheet 16 of the skin panel of FIG. 2 described earlier.

In constructing the skin panel 10' represented in FIG. 4, the intermediate spacer sheet 44 with the plurality of fly away tooling components 18 positioned in the plurality of cavities 54 is positioned between the outer sheet 12 and the inner sheet 14. The peripheral edge 24 of the outer sheet 12, the peripheral edge 24' of the inner sheet 14 and the peripheral edge 46 of the intermediate spacer sheet 44 are all coextensive and form a continuous, smooth peripheral edge surface around the skin panel 10'. The outer sheet 12, the inner sheet 14 and the intermediate spacer sheet 44 are then cured by the application of heat and pressure to the skin panel. This bonds the carbon fiber reinforced plastic material of the outer sheet 12, the inner sheet 14 and the intermediate spacer sheet 44 together forming the skin panel 10' as a single, integral unit. The thickness of the skin panel 10' between an outer surface of the skin panel defined by the first surface 26 of the outer sheet 12 and an inner surface of the skin panel defined by the second surface 28' of the inner sheet 14 is constant within the peripheral edge of the skin panel 10' defined by the peripheral edge 24 of the outer sheet 12, the peripheral edge 24' of the inner sheet 14 and the peripheral edge 46 of the intermediate sheet 44. The plurality of cavities 54 that form the grid inside the composite material of the skin panel 10' are sandwiched between an outer interior region of the composite material of the skin panel 10' that is created by the thickness of the outer sheet 12 and terminates at the first surface 26 of the outer sheet 12, and the interior region of the composite material of the skin panel 10' that is created by the thickness of the inner sheet 14 and terminates at the second surface 28' of the inner sheet 14. The plurality of cavities 54 are positioned in a single plane in an intermediate interior region of the skin panel 10' that is created by the thickness of the intermediate sheet 44.

Figure 5:
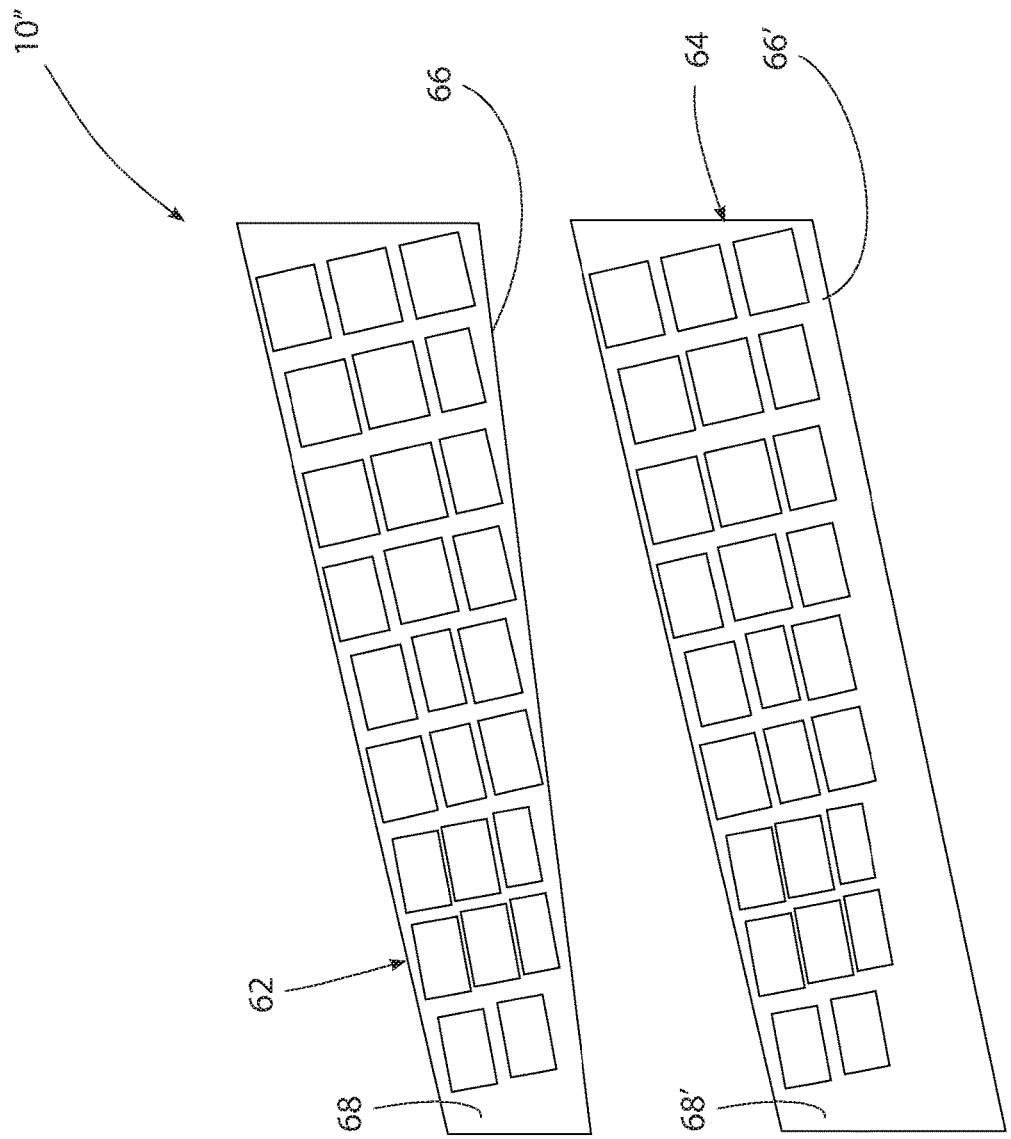
FIG. 5 is a schematic representation of an exploded view of the component parts of a still further embodiment of the skin panel.

FIG. 5 is a schematic representation of a method of constructing a still further embodiment of the skin panel 10'' of this disclosure. The skin panel 10'' of FIG. 5 is basically comprised of an outer sheet 62 and an inner sheet 64. The outer sheet 62 and the inner sheet 64 are each constructed of a composite material, for example carbon fiber reinforced plastic. In the construction of the skin panel 10'' represented in FIG. 5, the carbon fiber reinforced plastic has been cured.

The outer sheet 62 will make up a portion of the outer, exterior surface of the aircraft when the skin panel 10'' is attached to a structure of the aircraft. The outer sheet 62 is represented in FIG. 5 as having a peripheral edge 66 that extends entirely around the outer sheet 62. The peripheral edge 66 represented in FIG. 5 has four straight sections that define a polygonal configuration of the outer sheet 62. However, it should be understood that the peripheral edge 66 of the outer sheet 62 could have a variety of different configurations that best suit the outer sheet 62 for its intended use in the construction of an aircraft. The peripheral edge 66 is a continuous, smooth surface that extends entirely around the outer sheet 62. The peripheral edge 66 entirely surrounds a first surface 68 of the outer sheet 62 that will be directed to the exterior environment of the aircraft in use of the skin panel 10''. The first surface 68 is a continuous, smooth surface within the peripheral edge 66 of the outer sheet 62. The outer sheet 62 also has a second surface 72 on an opposite side of the outer sheet 62 from the first surface 68. The second surface 72 is also a continuous, smooth surface within the peripheral edge 66 and has the same configuration as the first surface 68. The outer sheet 62 has a constant thickness between the first surface 68 and the opposite second surface 72.

The inner sheet 64 has substantially the same construction as the outer sheet 62. As with the embodiment of the skin panel 10 represented in FIGS. 1 and 2, the inner sheet 64 is referred to as the inner sheet because it will be directed toward the interior of an aircraft structure when the skin panel 10'' is attached to an aircraft structure in use. The inner sheet 64 has a peripheral edge 66' that has substantially the same configuration as the peripheral edge 66 of the outer sheet 62. The peripheral edge 66' of the inner sheet 64 is a continuous, smooth surface that extends entirely around the inner sheet 64. The inner sheet 64 also has a first surface 68' that has substantially the same configuration as the second surface 72 of the outer sheet 62. The first surface 68' of the inner sheet 64 is a continuous, smooth surface within the peripheral edge 66' of the inner sheet 64. The inner sheet 64 also has a second surface 72' on an opposite side of the inner sheet from the first surface 68'. The second surface 72' has substantially the same configuration as the first surface 68' of the outer sheet 62. The second surface 72' is a continuous, smooth surface within the peripheral edge 66' of the inner sheet 64. The inner sheet 64 has a constant thickness between the first surface 68' and the second surface 72' within the peripheral edge 66' of the inner sheet.

Figure 6:
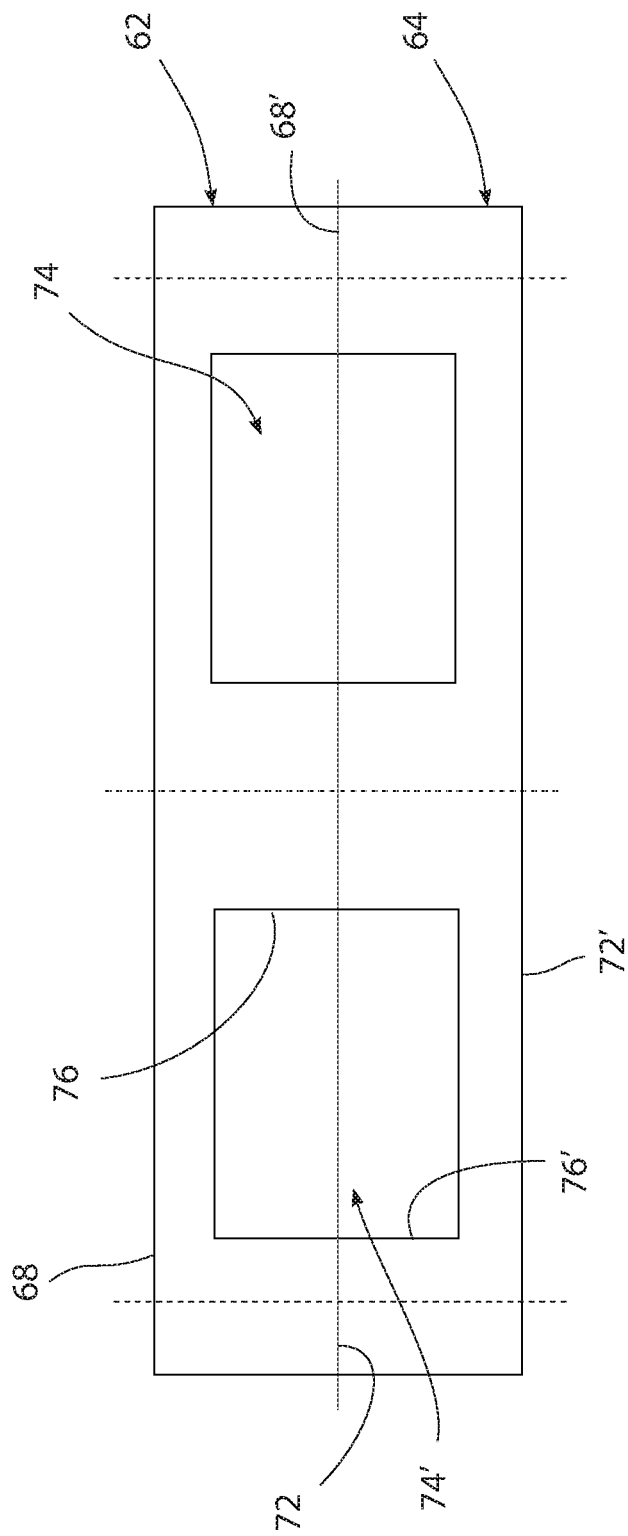
FIG. 6 is a schematic representation of a partial cross-section view of the assembled component parts of the skin panel of FIG. 5.

The construction of the skin panel 10'' represented in FIGS. 5 and 6 differs from the construction of the skin panels 10, 10' represented in FIGS. 1-4 in that it does not include an intermediate spacer sheet. Instead, a plurality of holes 74 are machined into the second surface 72 of the outer sheet 62 and a plurality of holes 74' are machined into the first surface 68' of the inner sheet 64. The pluralities of holes are mirror images of each other and form pluralities of cavities 74, 74' in the outer sheet 62 and the inner sheet 64, respectively. The plurality of cavities 74, 74' do not extend entirely through the respective outer sheet 62 and inner sheet 64. Each cavity of a plurality of cavities 74, 74' has a peripheral cavity surface 76, 76' that extends entirely around the cavity. The peripheral cavity surface 76, 76' has a length dimension around the cavity 74, 74' and a thickness dimension into the cavity. The thickness dimension of each cavity of the plurality of cavities 74, 74' is a same thickness dimension.

As represented in FIG. 5, each cavity 74, 74' of the plurality of cavities has a general rectangular configuration defined by the peripheral cavity surface 76, 76'. However, as explained earlier with regard to the embodiment of the skin panel represented in FIGS. 1 and 2, each cavity could have a different configuration defined by its peripheral cavity surface 74, 76'.

In constructing the skin panel 10'' represented in FIGS. 5 and 6, the second surface 72 of the outer sheet 62 is positioned against the first surface 68' of the inner sheet 64. The peripheral edge 66 of the outer sheet and the peripheral edge 66' of the inner sheet 64 are coextensive and form a continuous, smooth peripheral edge surface around the skin panel 10''. The outer sheet 62 and the inner sheet 64 are then secured together with adhesives on the engaging second surface 72 of the outer sheet 62 and first surface 68' of the inner sheet 64, or with mechanical fasteners or by other equivalent means to form the skin panel 10'' represented in FIGS. 5 and 6.

Although the skin panel 10'' represented in FIGS. 5 and 6 was described without the use of fly away tooling, fly away tooling could also be employed in the construction of the skin panel 10'' represented in FIGS. 5 and 6.

Figure 10:
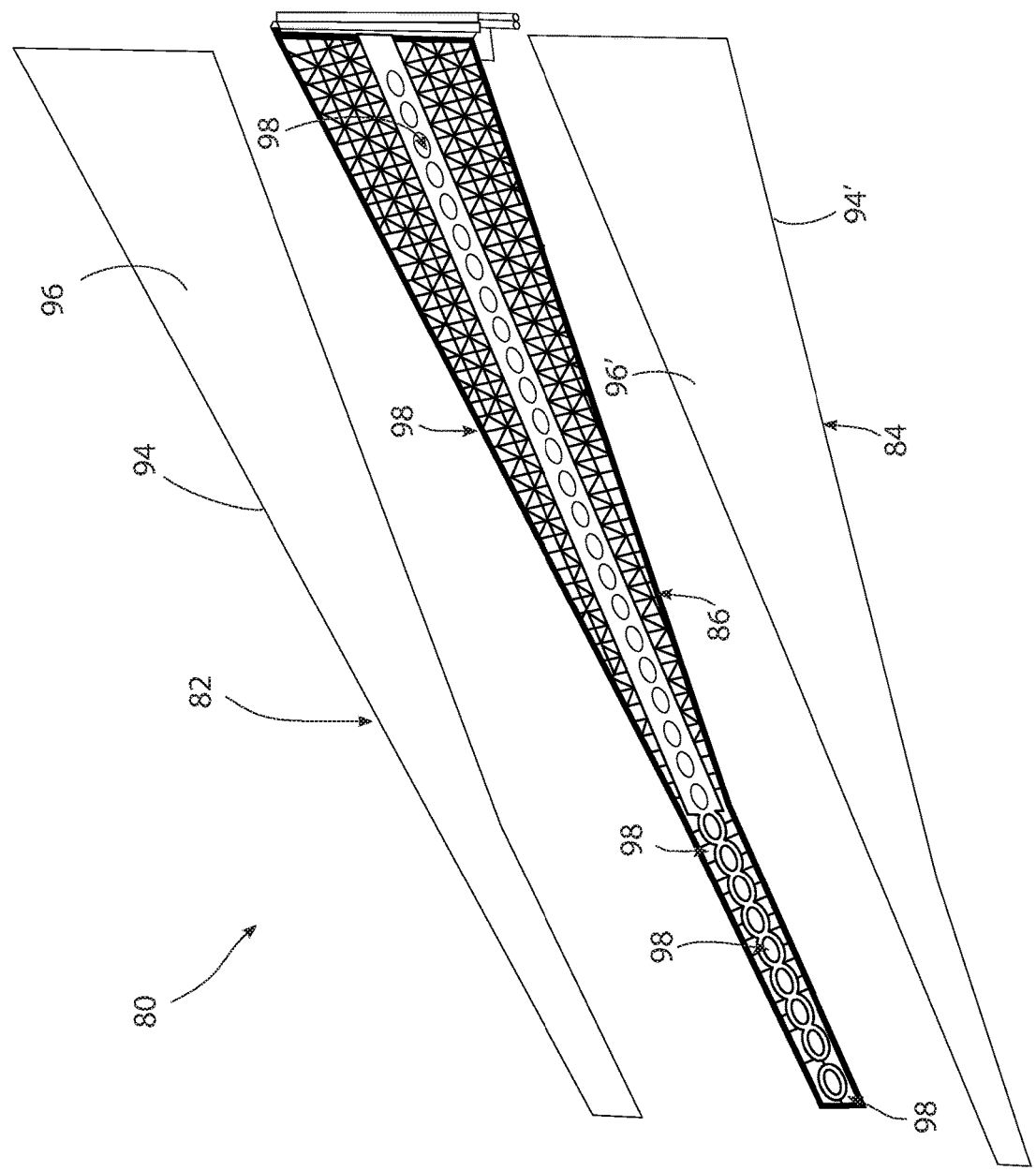
FIG. 10 is a schematic representation of an exploded view of the component parts of an embodiment of the skin panel having alternative cavity configurations.

FIG. 10 is a schematic representation of an exploded view of the component parts of an embodiment of the skin panel 80 having alternative cavity configurations. The skin panel 80 of FIG. 10 is basically comprised of an outer sheet 82, an inner sheet 84 and an intermediate spacer sheet 86. The outer sheet 82, the inner sheet 84 and the intermediate spacer sheet 86 are each constructed of a composite material, for example carbon fiber reinforced plastic. In the construction of the skin panel 80 represented in FIG. 10, the carbon fiber reinforced plastic is a pre-prep. Additionally, the outer sheet 82, the inner sheet 84 and the intermediate spacer sheet 86 have been pre-cured.

The outer sheet 82 will make up a portion of the outer, exterior surface of the aircraft when the skin panel 80 is attached to a structure of the aircraft. The outer sheet 82 is represented in FIG. 10 as having a peripheral edge 94 that extends entirely around the outer sheet 82. The peripheral edge 94 represented in FIG. 10 has five straight sections that define a general polygonal configuration of the outer sheet 82. However, it should be understood that the peripheral edge 94 of the outer sheet 82 could have a variety of different configurations that best suit the outer sheet 82 for its intended use in the construction of an aircraft. The peripheral edge 94 is a continuous, smooth surface that extends entirely around the outer sheet 82. The peripheral edge 94 entirely surrounds a first surface 96 of the outer sheet 82 that will be directed to the exterior environment of the aircraft in use of the skin panel 80. The first surface 96 is a continuous, smooth surface within the peripheral edge 94 of the outer sheet 82. The outer sheet 82 also has a second surface (not shown) on the opposite side of the outer sheet 82 from the first surface 96. The second surface is also a continuous, smooth surface within the peripheral edge 94 and has the same configuration as the first surface 96. The outer sheet 82 could have a constant thickness between the first surface 96 and the opposite second surface. Alternatively, the thickness of the outer sheet 82 could be non-constant and could taper as the outer sheet extends from one edge of the outer sheet 82 to the opposite edge of the outer sheet 82, for example from right to left as represented in FIG. 10.

The inner sheet 84 has substantially the same construction as the outer sheet 82. It is referred to as the inner sheet 84 because it will be directed toward the interior of an aircraft structure when the skin panel 80 is attached to an aircraft structure in use. The inner sheet 84 has a peripheral edge 94' that has substantially the same configuration as the peripheral edge 94 of the outer sheet 82. The peripheral edge 94' of the inner sheet 84 is a continuous, smooth surface that extends entirely around the inner sheet 84. The inner sheet 84 also has a first surface 96' that has substantially the same configuration as the first surface 96 of the outer sheet 82. The first surface 96' of the inner sheet 84 is a continuous, smooth surface within the peripheral edge surface 94' of the inner sheet 84. The inner sheet 84 also has a second surface (not shown) on an opposite side of the inner sheet 84 from the first surface 96'. The second surface has substantially the same configuration as the first surface 96'. The second surface is a continuous, smooth surface within the peripheral edge 94' of the inner sheet 84. The inner sheet 84 could have a constant thickness between the first surface 96' and the opposite second surface within the peripheral edge 94' of the inner sheet. Alternatively, the thickness of the inner sheet 84 could be non-constant and could taper as the inner sheet 84 extends from one edge of the inner sheet 84 to an opposite edge of the inner sheet, for example, from right to left as represented in FIG. 10.

The intermediate spacer sheet 86 has substantially the same configuration as the outer sheet 82 and the inner sheet 84. The intermediate spacer sheet 86 has a peripheral edge 94" that extends entirely around the intermediate spacer sheet. The peripheral edge 94" has substantially the same configuration as the peripheral edge 94 of the outer sheet 82 and the peripheral edge 94' of the inner sheet 84. The peripheral edge 94" of the intermediate spacer sheet 86 is a continuous, smooth surface entirely around the intermediate spacer sheet. A thickness of the intermediate spacer sheet 86 between the first surface 96" and an opposite second surface (not shown) could be constant within the peripheral edge 94" of the intermediate spacer sheet. Alternatively, the thickness of the intermediate spacer sheet 86 could be non-constant and could taper as the intermediate spacer sheet 86 extends from one edge to an opposite edge of the intermediate spacer sheet 86, for example from right to left as represented in FIG. 10.

A plurality of holes extend completely through the intermediate spacer sheet 86 and form a plurality of cavities 98 in the intermediate spacer sheet. Together the plurality of cavities 98 form a grid in the intermediate spacer sheet 86. Each cavity of the plurality of cavities 98 has a peripheral cavity surface that extends entirely around the cavity. The peripheral cavity surface has a length dimension around the cavity 98 and a thickness dimension across the cavity. The thickness dimension of each cavity of the plurality of cavities 98 has the same thickness dimension as the intermediate spacer sheet 86 at the area of the intermediate spacer sheet where the cavity is located. As represented in FIG. 10, the cavities 98 that form the grid are not limited to regular geometric patterns like triangles or squares, but include a combination of regular and non-regular shapes or configurations. There is no particular restriction on the grid pattern formed by the cavities 98.

In constructing the skin panel 80 represented in FIG. 10, the intermediate spacer sheet 86 is positioned between the outer sheet 82 and the inner sheet 84. The peripheral edge 94 of the outer sheet 82, the peripheral edge 94' of the inner sheet 84 and the peripheral edge 94" of the intermediate spacer sheet 86 are all coextensive and form a continuous, smooth peripheral edge surface around the skin panel 80. The outer sheet 82, the inner sheet 84 and the intermediate spacer sheet 86 are then secured together with adhesives by a secondary bond operation. Alternatively, the outer sheet 82, the inner sheet 84 and the intermediate spacer sheet 86 could be secured together by mechanical fasteners or by other equivalent means to form the skin panel 80.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

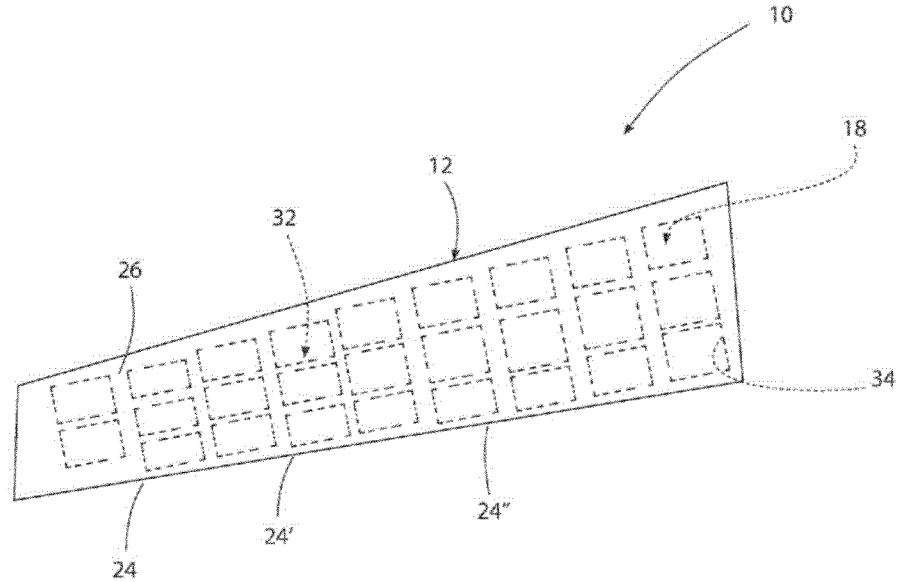

The invention claimed is:

1. A skin panel configured for attachment to an aircraft structure, the skin panel comprising:
   a material of the skin panel used in constructing the skin panel;
   a peripheral edge surface of the skin panel, the peripheral edge surface extending entirely around the skin panel, the peripheral edge surface being a continuous surface entirely around the skin panel;
   an outer surface of the skin panel, the outer surface being entirely surrounded by the peripheral edge surface, the outer surface being a continuous surface within the peripheral edge surface;
   an inner surface of the skin panel, the inner surface being entirely surrounded by the peripheral edge surface, the inner surface being a continuous surface within the peripheral edge surface, the inner surface being opposite the outer surface on the skin panel, the inner surface being configured for attachment to an aircraft structure;
   an outer interior region of the material of the skin panel, the outer interior region being inside the skin panel and terminating at the outer surface;
   an inner interior region of the material of the skin panel, the inner interior region being inside the skin panel and terminating at the inner surface; and,
   a plurality of cavities inside the material and surrounded by the material of the skin panel, the plurality of cavities being positioned in a single plane inside the material and between the outer surface and the inner surface.

2. The skin panel of claim 1, further comprising:
   an outer sheet of the material of the skin panel, the outer surface being on the outer sheet, the outer sheet having a thickness that defines the outer interior region of the material of the skin panel; and,
   an inner sheet of the material of the skin panel, the inner surface being on the inner sheet, the inner sheet having a thickness that defines the inner interior region of the material of the skin panel.

3. The skin panel of claim 1, further comprising:
   each cavity of the plurality of cavities is defined by a first surface adjacent the outer surface and a second surface adjacent the inner surface, the first surface and the second surface being on opposite sides of the cavity.

4. The skin panel of claim 3, further comprising:
the first surface and the second surface of each cavity being parallel;
each cavity of the plurality of cavities having a peripheral cavity surface that extends entirely around the cavity, the peripheral cavity surface having a length dimension around the cavity and a thickness dimension across the cavity; and,
the thickness dimension of the peripheral cavity surface of each cavity of the plurality of cavities being a same thickness dimension.

5. The skin panel of claim 1, further comprising:
an intermediate interior region of the material of the skin panel, the intermediate interior region being between the outer interior region and the inner interior region; and,
the plurality of cavities being positioned in the intermediate interior region.

6. The skin panel of claim 5, further comprising:
the outer interior region having a constant thickness;
the inner interior region having a constant thickness; and,
the intermediate interior region having a constant thickness.

7. The skin panel of claim 6, further comprising:
the material of the outer interior region, the material of the inner interior region and the material of the intermediate interior region being carbon fiber reinforced plastic; and,
the material of the outer interior region, the material of the inner interior region and the material of the intermediate interior region have been co-cured and bonded together forming the skin panel as a single, integral unit.

8. The skin panel of claim 6, further comprising:
the material of the intermediate interior region being a cured carbon fiber reinforced plastic and the material of the outer interior region and the material of the inner interior region being carbon fiber reinforced plastic that has been co-cured onto the material of the intermediate interior region.

9. The skin panel of claim 1, further comprising:
the material of the outer interior region and the material of the inner interior region being cured carbon fiber reinforced plastic that has been subsequently secured together.

10. A skin panel configured for attachment to an aircraft structure, the skin panel comprising:
a peripheral edge surface, the peripheral edge surface extending entirely around the skin panel, the peripheral edge surface being a continuous surface entirely around the skin panel;
an outer surface on the skin panel, the outer surface being entirely surrounded by the peripheral edge surface, the outer surface being a continuous surface within the peripheral edge surface;
an inner surface on the skin panel, the inner surface being entirely surrounded by the peripheral edge surface, the inner surface being a continuous surface within the peripheral edge surface, the inner surface being opposite the outer surface on the skin panel, the inner surface being configured for attachment to an aircraft structure; and,
a plurality of cavities inside the skin panel, the pluralities of cavities being between and spaced from the outer surface and the inner surface, and the plurality of cavities being surrounded by and spaced from the peripheral edge surface.

11. The skin panel of claim 10, further comprising:
an outer sheet of composite material, the outer surface being on the outer sheet;
an inner sheet of composite material, the inner surface being on the inner sheet; and,
the outer sheet and the inner sheet being secured together with the peripheral edge surface extending entirely around the outer sheet and inner sheet.

12. The skin panel of claim 10, further comprising:
each cavity of the plurality of cavities is defined by a first surface adjacent the outer surface and a second surface adjacent the inner surface, the first surface and the second surface being on opposite sides of the cavity; and,
the first surface and the second surface being parallel.

13. The skin panel of claim 12, further comprising:
each cavity of the plurality of cavities having a peripheral cavity surface that extends entirely around the cavity, the peripheral cavity surface having a length dimension around the cavity and a thickness dimension across the cavity; and,
the thickness dimension of the peripheral cavity surface of each cavity of the plurality of cavities being a same thickness dimension.

14. The skin panel of claim 10, further comprising:
a composite material of the skin panel used in constructing the skin panel, the composite material of the skin panel having an outer interior region adjacent the outer surface, an inner interior region adjacent the inner surface, and an intermediate interior region between the outer interior region and the inner interior region; and,
the plurality of cavities being positioned in the intermediate interior region.

15. The skin panel of claim 14, further comprising:
the outer interior region having a constant thickness;
the inner interior region having a constant thickness; and,
the intermediate interior region having a constant thickness.

16. The skin panel of claim 14, further comprising:
the composite material of the outer interior region, the composite material of the inner interior region and the composite material of the intermediate interior region being carbon fiber reinforced plastic; and,
the material of the outer interior region, the material of the inner interior region and the material of the intermediate interior region have been co-cured and bonded together forming the skin panel as a single, integral unit.

17. The skin panel of claim 14, further comprising:
the composite material of the intermediate interior region being a cured carbon fiber reinforced plastic and the composite material of the outer interior region and the composite material of the inner interior region being carbon fiber reinforced plastic that has been co-cured onto the composite material of the intermediate interior region.

18. The skin panel if claim 14, further comprising:
the composite material of the outer interior region and the composite material of the inner interior region being cured carbon fiber reinforced plastic that has been subsequently secured together.

* * * * *

UNITED STATES PATENT AND TRADEMARK OFFICE
CERTIFICATE OF CORRECTION

PATENT NO. : 11,511,847 B2
APPLICATION NO. : 15/471422
DATED : November 29, 2022
INVENTOR(S) : Steven P. Walker et al.

It is certified that error appears in the above-identified patent and that said Letters Patent is hereby corrected as shown below:

On the Title Page

Please replace the title page with the attached title page showing the corrected number of claims.

In the Claims

Claim 1, Column 10, Line 43: "an" should read -- the --;
Claim 3, Column 11, Line 2: "the cavity" should read -- each cavity of the plurality of cavities --;
Claim 4, Column 11, Line 4: "each cavity" should read -- each cavity of the plurality of cavities --;
Claim 4, Column 11, Line 7: "the cavity" should read -- each cavity of the plurality of cavities --;
Claim 4, Column 11, Line 9: "the cavity" should read -- each cavity of the plurality of cavities --;
Claim 4, Column 11, Lines 9-10: "the cavity" should read -- each cavity of the plurality of cavities --;
Claim 10, Column 11, Line 63: "an" should read -- the --;
Claim 10, Column 11, Line 65: "the pluralities" should read -- the plurality --;
Claim 11, Column 12, Line 11: "and inner" should read -- and the inner --;
Claim 12, Column 12, Line 16: "the cavity" should read -- each cavity of the plurality of cavities --;
Claim 13, Column 12, Line 21: "the cavity" should read -- each cavity of the plurality of cavities --;
Claim 13, Column 12, Line 23: "the cavity" should read -- each cavity of the plurality of cavities --;
Claim 13, Column 12, Lines 23-24: "the cavity" should read -- each cavity of the plurality of cavities --;
Claim 16, Column 12, Line 47: "the material of the outer" should read -- the composite material of the outer --;
Claim 16, Column 12, Lines 47-48: "the material of the inner" should read -- the composite material of the inner --;
Claim 16, Column 12, Lines 48-49: "the material of the intermediate" should read -- the composite material of the intermediate --;
Claim 18, Column 12, Line 60: "if" should read -- of --;
Claim 19 should be added and should read: -- The skin panel of claim 10, further comprising: each cavity of the plurality of cavities is defined by a first surface adjacent the outer surface and a second surface adjacent the inner surface, the first surface and the second surface being on opposite Signed and Sealed this
Eighth Day of October, 2024

Katherine Kelly Vidal
*Director of the United States Patent and Trademark Office* sides of each cavity of the plurality of cavities. --;

Claim 20 should be added and should read: -- The skin panel of claim 10, further comprising: an outer sheet of composite material, the outer surface being on the outer sheet; an inner sheet of composite material, the inner surface being on the inner sheet; and the outer sheet and the inner sheet being secured together with the peripheral edge surface extending around the outer sheet and the inner sheet. --.

CERTIFICATE OF CORRECTION (continued)

(12) United States Patent
Walker et al.

(10) Patent No.: US 11,511,847 B2
(45) Date of Patent: Nov. 29, 2022

(54) SKIN PANEL OF COMPOSITE MATERIAL HAVING AN INTERNAL GRID

(71) Applicant: The Boeing Company, Chicago, IL (US)

(72) Inventors: Steven P. Walker, Arlington, WA (US); Gregory M. Santini, Bothell, WA (US); Gary D. Oakes, Renton, WA (US); Patrick B. Stickler, Everett, WA (US)

(73) Assignee: The Boeing Company, Chicago, IL (US)

( * ) Notice: Subject to any disclaimer, the term of this patent is extended or adjusted under 35 U.S.C. 154(b) by 1203 days.

(21) Appl. No.: 15/471,422

(22) Filed: Mar. 28, 2017

(65) Prior Publication Data
US 2018/0281923 A1    Oct. 4, 2018

(51) Int. Cl.
*B32B 1/02*   (2006.01)
*B64C 3/26*   (2006.01)
*B64C 1/12*   (2006.01)
*B64C 3/20*   (2006.01)
*B32B 1/08*   (2006.01)
*B64C 1/00*   (2006.01)

(52) U.S. Cl.
CPC ............. *B64C 3/26* (2013.01); *B64C 1/12* (2013.01); *B64C 3/20* (2013.01); *B64C 2001/0072* (2013.01)

(58) Field of Classification Search
CPC .. B32B 1/02; B32B 3/26; B32B 27/00; B32B 27/20; Y10T 428/1352

USPC ................................. 428/35.7, 304.4
See application file for complete search history.

(56) References Cited

U.S. PATENT DOCUMENTS

| | | |
|---|---|---|
| 6,007,894 A | 12/1999 | Barnes et al. |
| 6,513,757 B1 | 2/2003 | Amaoka et al. |
| 7,097,731 B2 * | 8/2006 | Puriefoy .......... B29C 37/0075 156/212 |
| 7,197,852 B2 | 4/2007 | Grillos |
| 8,642,151 B2 | 2/2014 | Goering et al. |
| 8,851,422 B2 | 10/2014 | Dan-Jumbo |
| 8,973,871 B2 * | 3/2015 | Marcoe ............ B64C 3/185 244/123.7 |
| 9,302,446 B2 | 4/2016 | Fink |
| 2009/0038744 A1 * | 2/2009 | Lee .................. B29C 70/342 156/183 |
| 2009/0148647 A1 * | 6/2009 | Jones ............... B29C 70/30 428/58 |
| 2009/0283635 A1 * | 11/2009 | Gerken ............. B29D 24/005 244/117 R |

* cited by examiner

*Primary Examiner* — Marc A Patterson
(74) *Attorney, Agent, or Firm* — Quinn IP Law

(57) ABSTRACT

A skin panel configured for attachment to an aircraft structure is constructed of a composite material and has a continuous, smooth outer surface; a continuous, smooth inner surface that is configured for attachment to an aircraft structure; a peripheral edge that extends entirely around the skin panel and has a continuous, smooth surface and a plurality of cavities inside the material of the skin panel. The cavities reduce the weight of the skin panel without significantly detracting from the compression strength and tensile strength of the skin panel.

20 Claims, 10 Drawing Sheets